US012710724B2

(12) United States Patent
Villaret

(10) Patent No.: US 12,710,724 B2
(45) Date of Patent: Aug. 18, 2026

(54) TRANSMISSION MECHANISM FOR AN AUTOMATIC WINDING CHAIN

(71) Applicant: ROLEX SA, Geneva (CH)

(72) Inventor: Pierre Villaret, Villy-le-Pelloux (FR)

(73) Assignee: ROLEX SA, Geneva (CH)

( * ) Notice: Subject to any disclaimer, the term of this patent is extended or adjusted under 35 U.S.C. 154(b) by 280 days.

(21) Appl. No.: 18/518,432

(22) Filed: Nov. 22, 2023

(65) Prior Publication Data

US 2024/0176295 A1 May 30, 2024

(30) Foreign Application Priority Data

Nov. 25, 2022 (EP) .................................... 22209734

(51) Int. Cl.
*G04B 5/10* (2006.01)
*G04B 7/00* (2006.01)

(52) U.S. Cl.
CPC ................ *G04B 5/10* (2013.01); *G04B 7/00* (2013.01)

(58) Field of Classification Search
CPC ... G04B 5/08; G04B 5/14; G04B 5/16; G04B 5/165; G04B 7/00
See application file for complete search history.

(56) References Cited

U.S. PATENT DOCUMENTS 2,620,620 A 12/1952 Meyer
3,685,279 A * 8/1972 Scholz .................. G04C 3/066 968/102
2008/0304371 A1* 12/2008 Damasko ................ G04B 5/08 368/208
2010/0135126 A1 6/2010 Born et al.
2010/0135127 A1 6/2010 Born et al.
2011/0299366 A1 12/2011 Giacobino
2016/0259299 A1* 9/2016 Kahn .................... G04D 99/00
2017/0123376 A1* 5/2017 Bertrand ................ G04B 11/00
2020/0218199 A1* 7/2020 Fleury ................... G04B 13/02

FOREIGN PATENT DOCUMENTS

CH 277730 A 9/1951
CH 357335 A 9/1961
CN 2727814 Y 9/2005
EP 2175329 A1 4/2010
EP 2392975 A2 12/2011
EP 2634650 A2 9/2013

OTHER PUBLICATIONS

European Search Report and Written Opinion dated Mar. 22, 2024 in counterpart application No. EP 23211913; with English machine translation (total 16 pages) (note: CN2727814 and EP2634650, D3 and D4 in the ESR, are not listed in this IDS since they are already of record).
European Search Report and Written Opinion dated Aug. 22, 2023 in priority application No. EP22209734.7; with English machine translation (total 19 pages).

* cited by examiner

*Primary Examiner* — Renee S Luebke
*Assistant Examiner* — Matthew Daniel Hwang
(74) *Attorney, Agent, or Firm* — Seckel IP, PLLC

(57) ABSTRACT

The transmission mechanism (110) for an automatic winding chain for a timepiece (400) includes a series assembly of a first freewheel (40) functioning by wedging, a reverser (50) including at least one unidirectional coupling functioning by obstacle or at least one second freewheel (51*a*, 51*b*) functioning by obstacle, and a winding mobile mass (60).

22 Claims, 4 Drawing Sheets

TRANSMISSION MECHANISM FOR AN AUTOMATIC WINDING CHAIN

This application claims priority of European patent application No. EP22209734.7 filed Nov. 25, 2022, the content of which is hereby incorporated by reference herein in its entirety.

BACKGROUND ART

The invention concerns a transmission mechanism for an automatic winding chain. The invention also concerns an automatic winding chain including a transmission mechanism of this kind. The invention also concerns a timepiece movement including a transmission mechanism of this kind or an automatic winding chain of this kind. The invention finally concerns a timepiece including a transmission mechanism of this kind or an automatic winding chain of this kind or a timepiece movement of this kind.

Reversing systems employing pawl freewheels are today widely used in horology for automatic winding of a barrel spring. Pawl freewheels constitute a reliable and robust solution enabling the benefit of:

- high-performance automatic winding thanks in particular to a low dead angle,
- low sensitivity to pollution, and
- low intrinsic friction.

For the dead angle of the reversing system relative to the oscillating mass to be as low as possible, it is preferable to arrange the reversing system as close as possible to the latter. However, because of the high transmission ratio of the automatic winding chain, an arrangement of this kind generates extreme mechanical loads on the wheels of the reversing system during manual winding. In fact, the closer the reversing system is to the oscillating mass, the higher the transmission ratio from the winding stem and therefore the faster the wheels forming part of the reversing system turn during manual winding. With an arrangement of this kind the rotation speed of the wheels of the reversing system can generate oscillation of the pawls at a frequency greater than 3 000 Hz, or even greater than 5 000 Hz. These extreme loads are liable to degrade the pawl freewheels through premature wear of the pawls and/or the complementary teeth. Moreover, during manual winding oscillation of the pawls of the pawl freewheels closest to the oscillating mass generate a high torque transmitted to the winding stem. Because of this, the torque that the kinematic systems have to withstand is also higher, which can also cause premature ageing of the various wheel sets.

From a sensory point of view, these loads can generate a sensation of scraping on the winding stem and a disagreeable noise for the user of the watch.

Freewheel solutions are known enabling disengagement of the automatic winding chain during manual winding which alleviates the premature wear of the reversing system. Given that disengagement is effected only during manual winding, that is to say by the effect of a torque exerted by the user, the freewheel known from the prior art is of simpler design and offers lower performance than those that constitute a reversing system. Said freewheel may have a rudimentary shape with one or more leaf springs or pawls adapted to cooperate by obstacle with a toothed wheel and able to generate a high disengagement torque. It is generally disposed as close as possible to the barrel ratchet so as to prevent too high a rotation speed during manual winding and thus to prevent premature wear.

Because of its relatively simple design, the freewheel known from the prior art can generate the following disadvantages:

- Variations of torque on the winding stem felt by the user during manual winding.
- A scraping sensation and/or noise caused by the oscillation of the leaf springs or the pawls.
- Reduced efficacy of automatic winding following manual winding.

In Théorie d'horlogerie (Reymondin et al., éditions de la Fédération des Écoles Techniques, 1998), disengaging an automatic winding chain during manual winding is described. A freewheel is arranged in a ratchet drive mobile. This freewheel includes, for example, a spring with arms secured to a pinion, intended to cooperate with a ratchet drive wheel around the pinion. The torque needed to disengage this type of freewheel may be relatively high. This high disengagement torque may constitute a problem if it is greater than the reversing system disengagement torque simply because the freewheel will be only partially or not at all functional. In fact, it might not disengage except in the case of severe wedging or scraping of the reversing system and would then inevitably generate variations of noise and of sensation on the winding stem potentially uncomfortable for the user. Disposing this freewheel near the ratchet also implies that the torque that it has to withstand during automatic winding is high.

Disengaging an automatic winding chain using an elastic pawl is also described in the document CH277730A. As in the previous solution, this freewheel is arranged in a ratchet driver engaged with a ratchet.

The document EP2392975A2 discloses a particular construction of a freewheel with elastic pawls intended to cooperate with internal teeth. The arrangement of the freewheel in the automatic winding chain remains similar to the previous solutions described.

The document EP2634650A2 discloses a solution using a freewheel arranged in a mobile of a Pellaton-type reversing system. This enables disengagement of the reversing system during manual winding with a freewheel functioning by obstacle.

SUMMARY OF THE INVENTION

The object of the invention is to provide a transmission mechanism solving the problems mentioned above and enabling improvement of the transmission mechanism known from the prior art. In particular the invention proposes a transmission mechanism enabling optimisation of performance and what the user feels during manual winding.

A transmission mechanism according to the invention is defined by point 1 below.

1. Transmission mechanism for an automatic winding chain for a timepiece including a series assembly of:
   - a first freewheel functioning by wedging,
   - a reverser including at least one unidirectional coupling functioning by obstacle or at least one second freewheel functioning by obstacle, and
   - a winding mobile mass.

Embodiments of a transmission mechanism according to the invention are defined by points 2 to 7 below.

2. Transmission mechanism according to point 1 wherein the reverser and the first freewheel are mechanically connected directly to one another, in particular directly connected by direct meshing of an output of the reverser with an input of the first freewheel.

3. Transmission mechanism according to point 1 or 2 wherein a first reduction ratio between:
   an output of the reverser, and
   an input of the first freewheel is less than 8, or even less than 6, or even less than 5.
4. Transmission mechanism according to any one of the preceding cla points ims wherein at least one second freewheel is a freewheel with at least one pawl.
5 Transmission mechanism according to the preceding point wherein the at least one pawl is made of ceramic.
6. Transmission mechanism according to any one of the preceding points wherein the first freewheel includes at least one blocking element functioning by wedging, in particular:
   rolling elements such as balls or rollers or runners, in particular ceramic rolling elements such as ceramic balls or ceramic rollers or ceramic runners, or
   sliding elements such as shape runners or cams, in particular ceramic sliding elements such as ceramic shape runners or ceramic cams.
7. Transmission mechanism according to any one of the preceding points wherein the reverser includes two second freewheels so that an output of the reverser turns in the same given direction whatever the direction of an input of the reverser.

An automatic winding chain or an automatic winding module according to the invention is defined by point 8 below.

8. Automatic winding chain or automatic winding module including a transmission mechanism according to any one of the preceding points.

Embodiments of an automatic winding chain or an automatic winding module according to the invention are defined by points 9 and 10 below.

9. Automatic winding chain or automatic winding module according to the preceding point includes a first reduction chain extending from the winding mobile mass (60) to the first freewheel having a second reduction ratio less than 6, or even less than 5, or even less than 4, and/or including a second reduction chain extending from the first freewheel to a ratchet of the barrel having a third reduction ratio greater than 20, or even greater than 25, or even greater than 30.
10. Automatic winding chain or automatic winding module according to either one of points 8 or 9 wherein an input of the reverser and the winding mobile mass are mechanically connected directly to one another, in particular directly connected by an input of the reverser meshing with teeth of the winding mobile mass.

A timepiece movement according to the invention is defined by point 11 below.

11. Timepiece movement including a transmission mechanism according to any one of points 1 to 7 and/or an automatic winding chain according to any one of points 8 to 10 and/or an automatic winding module according to any one of points 8 to 10.

Embodiments of a timepiece movement according to the invention are defined in points 12 and 13 below.

12. Timepiece movement according to the preceding point including a manual winding chain, in particular a manual winding chain that can be manipulated by a user via an actuator member, in particular a stem.
13. Timepiece movement according to point 11 or 12 including an automatic winding chain adapted to be disengaged during manual winding by manipulating the stem.

A timepiece according to the invention is defined by point 14.

14. Timepiece including:
   a movement according to points 11 to 13, and/or
   an automatic winding chain according to points 8 to 10, and/or
   an automatic winding module according to points 8 to 10, and/or
   a transmission mechanism according to any one of points 1 to 7.

BRIEF DESCRIPTION OF THE DRAWINGS

The appended drawings represent by way of example one embodiment of a timepiece according to the invention.

DETAILED DESCRIPTION OF PARTICULAR EMBODIMENTS

Figure 1:
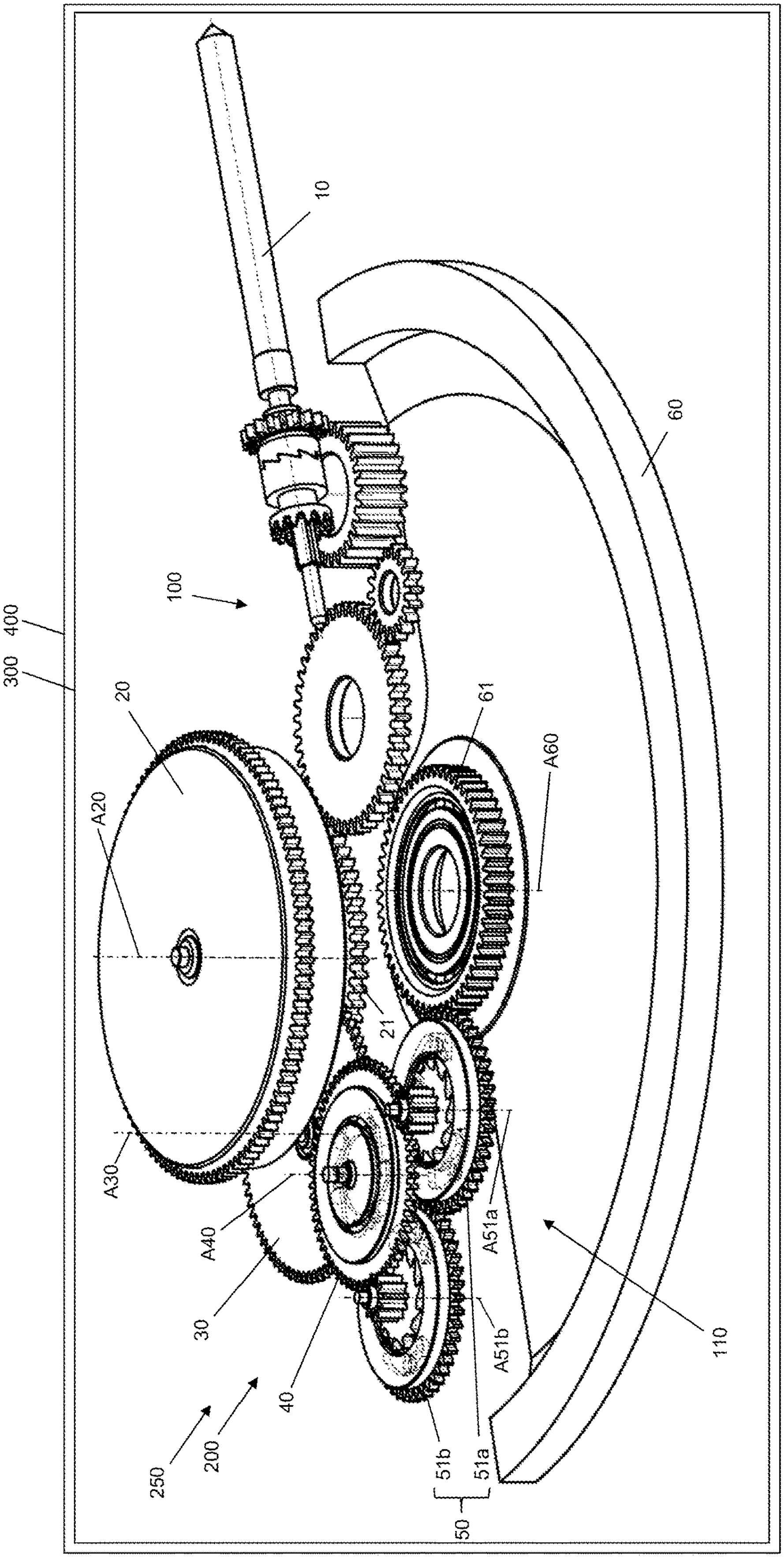
FIG. 1 is a schematic view of one embodiment of a timepiece according to the invention.
Figure 2:
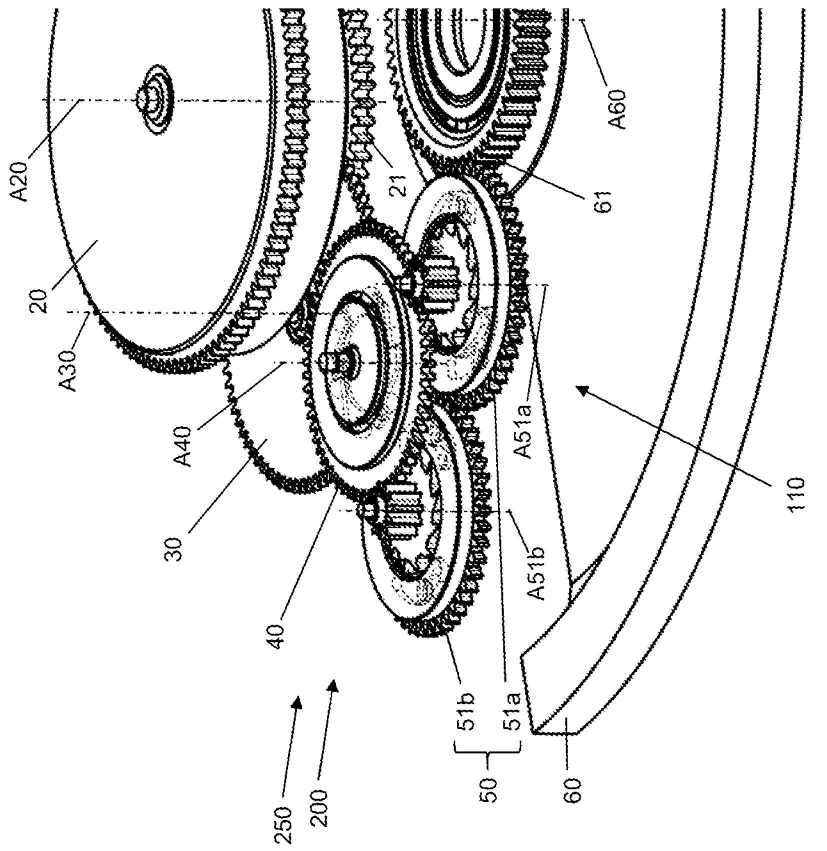
FIG. 2 is a perspective view of part of an embodiment of a transmission mechanism.

A first embodiment of a timepiece 400 is described in detail hereinafter with reference to FIGS. 1 to 4.

The timepiece 400 is for example a watch, in particular a wristwatch. The timepiece 400 includes a timepiece movement 300 intended to be mounted in a timepiece case in order to protect it from the external environment.

The timepiece movement 300 is an automatic movement or a hybrid movement.

The timepiece movement 300 includes an automatic winding chain 200. This automatic winding chain may be included in an automatic winding module 250 mounted on the rest of the timepiece movement, in particular an automatic winding module 250:

- fixed to a plate or to at least one bridge of a frame of the timepiece movement 300, and
- mechanically connected to a barrel 20 of the timepiece movement 300.

The automatic winding chain 200 includes a transmission mechanism 110.

The transmission mechanism 110 includes a series assembly of:

- a first freewheel 40 functioning by wedging,
- a reverser 50 including at least one unidirectional coupling functioning by obstacle or at least one second freewheel 51*a*, 51*b* functioning by obstacle, and
- a winding mobile mass 60 or oscillating mass 60.

Figure 5:
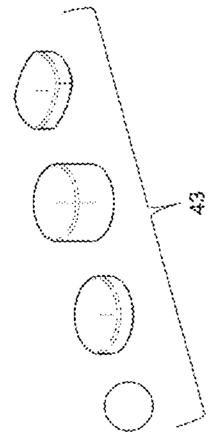
FIG. 5 illustrates schematically rolling or sliding elements, including, respectively: a ball (first from left), a runner having a shape adapted for rolling (second from left), a roller (third from left), a cam or a runner having a shape adapted for sliding (fourth from left).
Figure 4:
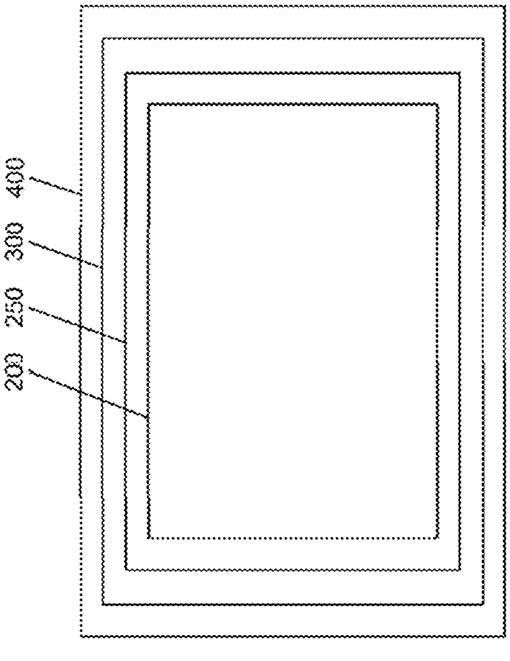
FIG. 4 is a schematic view of an embodiment of a timepiece according to the invention.

By “freewheel functioning by wedging” is meant a freewheel the engagement function of which is achieved by wedging or jamming caused by the friction of rolling elements such as balls or rollers or runners, or sliding elements such as cams or shape runners, as illustrated in FIG. 5.

By “unidirectional coupling functioning by obstacle” is meant a reverser as described in particular on pages 178 and 179 of the book "Théorie d'horlogerie" (Reymondin et al., éditions de la Fédération des Écoles Techniques, 1998), that is to say:

- a mechanism employing cams or pawl-levers functioning in the manner of an obstacle, or
- a mechanism with alternately engaged toothed wheels functioning in the manner of an obstacle, or
- a mechanism using engagement mobiles functioning by obstacle.

By "freewheel functioning by obstacle" is meant a freewheel the engagement function of which is assured by elements constituting obstacles to one another (and therefore functioning even in the absence of friction between these elements).

By "freewheel" is meant an assembly comprising:

- an input mounted rotatable relative to the frame,
- an output mounted rotatable relative to the frame, and
- a linked mechanism enabling the input and the output to be linked or secured together when a relative movement between the input and the output in a first direction is requested, and allowing a free relative movement between the input and output in a second direction, opposite to the first direction.

The reverser 50 is a direction reverser or a reversing system 50 and enables conversion of:

- the movement of the winding mobile mass 60 that may in particular include, when the timepiece is worn, random movements in rotation, into
- a unidirectional movement in rotation.

To this end the winding mobile mass is mechanically connected to an input of the reverser and the unidirectional movement in rotation is obtained at an output of the reverser.

The first freewheel 40 enables disengagement of the reverser 50 during manual winding, that is to say when a user arms or winds the barrel 20 by exerting action on a manual winding member, for example by applying a movement in rotation to a stem 10 via a crown. This disengagement enables decoupling or unfastening of the reverser and of the part of the system downstream of the first freewheel.

The automatic winding chain or automatic winding kinematic system 200 enables arming or automatic winding of a barrel 20 thanks to transmission of energy from the movements of the winding mobile mass 60.

The barrel 20 can also be wound manually by a winding stem 10 via a manual winding kinematic chain 100.

In the embodiment represented the at least one second freewheel 51*a*, 51*b* forms a unidirectional coupling advantageously functioning by obstacle. In other words, this unidirectional coupling includes at least one element able to drive a first mobile by constituting an obstacle to it, such as a pawl, a hook, a leaf spring or a mobile pinion. This type of unidirectional coupling is advantageously very robust and able to withstand very numerous reversals of the rotation direction of the winding mobile mass 60, with a low dead angle and a low sensitivity to pollution that might degrade its performance. On the other hand, it may have some sensitivity to wear during high rotation speeds induced by manual winding (in the absence of a first freewheel 40 as in this embodiment). This is in particular the case when the freewheels are directly engaged with the winding mobile mass. Alternatively, the reverser 50 may include at least one mobile pinion, that is to say a pinion movable between:

- a first configuration fastening together the input and the output of the reverser, and
- a second configuration disengaging the input of the reverser from the output.

In the embodiment represented the first freewheel 40 advantageously functions:

- by wedging at least one rolling element 43 such as a ball, a roller, a runner, or
- by wedging at least one sliding element such as in particular a shape runner, a cam. All of these components may optionally be prestressed in the engaged position by an elastic return means. Differing from the mobile pinion or a second freewheel 51*a*, 51*b*, this first freewheel 40 constitutes or forms part of a unidirectional coupling not including any element liable to oscillate during disengagement. Consequently, this type of freewheel advantageously generates no or little variation of torque and of noise. On the other hand, the dead angle of a freewheel functioning by wedging is directly dependent on the intrinsic coefficient of friction. Consequently, the first freewheel 40 is more sensitive to pollution. It is therefore preferable not to use this kind of freewheel structure in the reverser. However, this aspect is of secondary importance for the disengagement of a winding system because once the first freewheel 40 has been engaged said dead angle does not influence or no longer influences automatic winding performance.

The elements 43 of the freewheel are blocking elements. These blocking elements may advantageously be made of ceramic, in particular technical ceramic. FIG. 5 illustrates schematically variants of the blocking elements 43, including, respectively: a ball (first from left), a runner having a shape adapted for rolling (second from left), a roller (third from left), a cam or a runner having a shape adapted for sliding (fourth from left).

As already mentioned, the automatic winding kinematic chain 200 enables winding of a spring of the barrel 20 thanks to the energy induced by the movements of the winding mobile mass 60. Winding can be directional, that is to say effective whatever the direction of rotation of the winding mobile mass 60. The winding mobile mass 60 can pivot in a ball bearing on the frame of the movement or on a frame of the automatic winding module. The automatic winding chain 200 includes a plurality of mobiles including, from the upstream side (the winding mobile mass) to the downstream side (the barrel):

- the winding mobile mass 60,
- the reverser 50,
- the first freewheel 40, and
- a ratchet driver 30 meshing with a ratchet 21 connected to the spring of the barrel 20.

The various mobiles or elements are preferably mechanically connected to one another by meshing with one another. The mechanical connections may be direct or indirect. In the case of two elements indirectly connected to one another, one or more intermediate wheels may be provided between the elements. These intermediate wheels may contribute to producing an optimised transmission ratio between the elements.

One or more intermediate wheels may be disposed between:

- the winding mobile mass 60 and the reverser 50, and/or
- the reverser 50 and the first freewheel 40, and/or
- the first freewheel 40 and the driver 30.

The reverser 50 and the first freewheel 40 are advantageously mechanically connected to one another, in particular directly connected by direct meshing of an output of the reverser 50, or of the outputs of the reverser 50, with an input of the first freewheel 40.

An input of the reverser 50, or inputs of the reverser 50, and the winding mobile mass 60 are advantageously mechanically connected directly to one another, in particular directly connected by of an input of the reverser 50 or inputs of the reverser 50 meshing with teeth 61 on the winding mobile mass 60.

It is preferable if:

the winding mobile mass is mobile in rotation about an axis A60, the reverser 50 includes two unidirectional couplings 51*a*, 51*b* mobile in rotation about axes A51*a*, A51*b*, the first freewheel 40 is mobile in rotation about an axis A40, the ratchet driver 30 is mobile in rotation about an axis A30, and the barrel 20, in particular the ratchet 21, is mobile in rotation about an axis A20.

The various axes A60, A51*a*, A51*b*, A40, A30 and A20 are preferably parallel to one another.

The winding mobile mass, the unidirectional couplings 51*a*, 51*b*, the first freewheel 40, the ratchet driver 30 and the barrel 20 are preferably guided in rotation on the frame of the movement and/or on a frame of the automatic winding module.

The transmission or reduction ratio between the winding mobile mass 60 and the ratchet 21 is of the order of 110 to 180. In other words, it is necessary for the winding mobile mass 60 to turn 110 to 180 times to induce rotation of the ratchet 21 by one turn.

The timepiece 400 preferably includes the winding stem 10 connected to the ratchet 21 by a manual winding chain 100 in order to enable manual winding or arming of the spring of the barrel 20.

The reverser 50 preferably includes two pawl freewheels 51*a*, 51*b*. The reverser 50 is advantageously directly engaged with the winding mobile mass 60, in particular with teeth 61 on the winding mobile mass 60, so that the dead angle of the reverser 50 relative to the winding mobile mass 60 is as small as possible, thus optimising automatic winding performance. Furthermore, in the embodiment shown the inputs 52*a*, 52*b* of the two second freewheels are advantageously rotationally coupled to one another directly by meshing. Only one input 52*a* of the two inputs 52*a*, 52*b* is connected directly in rotation to the winding mobile 60 by meshing therewith.

Alternatively, the two outputs of the two second freewheels may be rotationally coupled to one another directly by meshing and the two inputs may each be rotationally coupled directly to the winding mobile mass by meshing therewith.

The pawl freewheels 51*a*, 51*b* respectively include a pawl carrier wheel 52*a*, 52*b*, a cover 56*a*, 56*b* and two pawls 53*a*, 53*b*. The pawls 53*a*, 53*b* pivot on the pawl carrier wheel 52*a*, 52*b* and/or the cover 56*a*, 56*b*. Cooperation of the cover 56*a*, 56*b* and the pawl carrier wheel 52*a*, 52*b* enables retention of the pawls 53*a*, 53*b* in the at least one second freewheel 51*a*, 51*b*. The pawls 53*a*, 53*b* are advantageously made of ceramic, in particular technical ceramic.

The pawls 53*a*, 53*b* are designed to cooperate with a sawtooth toothed wheel 54*a*, 54*b* secured to a pinion 55*a*, 55*b*. The toothed wheel 54*a*, 54*b* is able to pivot relative to the pawl carrier wheel 52*a*, 52*b*. The respective asymmetric shapes of the pawls 53*a*, 53*b* and the toothed wheel 54*a*, 54*b* enable unidirectional coupling. The toothed wheels 54*a*, 54*b* are for example made of ceramic, in particular technical ceramic. The operation of a freewheel of this type is described for example in the document EP3285123A1.

In the automatic winding chain 200 the wedging type first freewheel 40 is advantageously a ball type freewheel 40 directly engaged with the reverser 50, between the latter and the ratchet 21. The first freewheel 40 more particularly includes a wheel 41 that is directly engaged with at least one of the two pinions 55*a*, 55*b* of the two second wheels 51*a*, 51*b*. The first freewheel 40 is moreover engaged with the ratchet driver 30 via a pinion 45 of the first freewheel 40.

In the automatic winding chain 200 the first freewheel 40 disposed in this way in direct engagement with the reverser 50 obtains the benefit of a dead angle relative to the winding mobile mass 60 that is minimised. With a disposition of this kind, after manual winding fewer turns of the winding mobile mass are therefore needed to make up said dead angle and to render automatic winding effective again. Moreover, this disposition of the first freewheel 40 also makes it possible to reduce the transmission torque that said first freewheel must withstand compared to a disposition of the first freewheel 40 close to the ratchet 21, for example.

In this embodiment, like a ball bearing, the first freewheel 40 includes six balls 43 guided in a sliding or rolling track 44 defining the interface between a wheel 41 and a ring 46 secured to the pinion 45. Furthermore, in a first configuration, upon immobilisation of the wheel 41 and the ring 46 to secure them to one another, the balls also make it possible, in a second configuration, to guide rotation of the ring 46 relative to the wheel 41 or to participate in such guidance.

Each ball 43 takes its place in a housing provided with an inclined plane machined in a separator 42. The separator 42 may comprise a plurality of parts, here three parts. Said inclined plane participates in the unidirectional coupling. In fact, in a first so-called engagement relative rotation direction the balls cooperate with the inclined plane so as to become wedged in the housing and to constrain the wheel 41 to rotate with the ring 46 by means of the separators 42. The latter are then tighten again around the ring 46, like a radial engagement or a radial action brake on the ring 46. In a second so-called free relative rotation direction (second direction opposite the first direction), the balls are out of reach of the portions of the inclined planes adapted to wedge the balls 43 so as to disengage the wheel 41 from the ring 46 and enable relative rotation between these two elements.

During an automatic winding phase the ball type first freewheel 40 is in an engaged configuration or goes from a disengaged configuration to an engaged configuration. In fact, during this phase the reverser 50 still drives the wheel 41 in the engagement relative direction, i.e. the anticlockwise direction in FIG. 3. The rotation of the wheel 41 generates the engagement of the pinion 45 thanks to the wedging of the balls 43 on the inclined planes of the housings of the separators 42.

Figure 3:
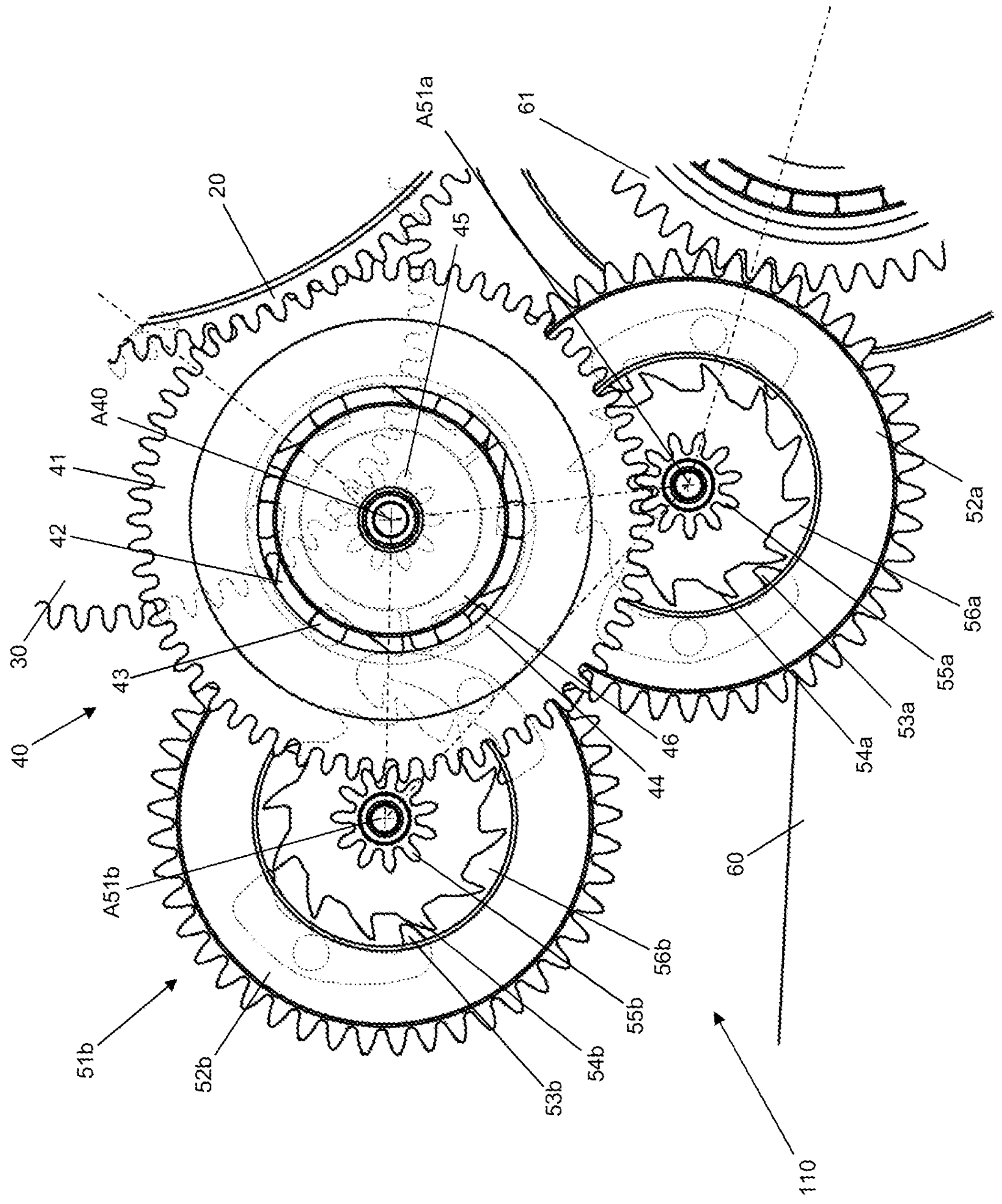
FIG. 3 is a view from above of part of the embodiment of the transmission mechanism.

The first freewheel 40 remains engaged whatever the direction of rotation of the winding mobile mass 60. In fact, when the winding mobile mass 60 turns in the clockwise direction in FIG. 3, as a consequence of the meshing thereof:

the pawl carrier wheel 52*a* meshed directly with the winding mobile mass 60 turns in the anticlockwise direction in FIG. 3, the pawl carrier wheel 52*b* meshed indirectly with the winding mobile mass 60 turns in the clockwise direction in FIG. 3.

The pinion 55*a* associated with the pawl carrier wheel 52*a* meshed directly with the winding mobile mass 60 is able to turn freely in the clockwise direction (wheel 51*a* disengaged) and the pinion 55*b* associated with the pawl carrier wheel 52*b* meshed indirectly with the winding mobile mass 60 turns in the clockwise direction (wheel 51*b* engaged).

Here it follows that the wheel 41 turns in the anticlockwise direction. The two second freewheels 51*a*, 51*b* are respectively disengaged and engaged.

When the winding mobile mass 60 turns in the anticlockwise direction in FIG. 3, as a consequence of the meshing thereof:

- the pawl carrier wheel 52*a* meshed directly with the winding mobile mass 60 turns in the clockwise direction in FIG. 3,
- the pawl carrier wheel 52*b* meshed indirectly with the winding mobile mass 60 turns in the anticlockwise direction in FIG. 3, The pinion 55*b* associated with the pawl carrier wheel 52*b* meshed indirectly with the winding mobile mass 60 is able to turn freely in the clockwise direction (wheel 51*b* disengaged) and the pinion 55*a* associated with the pawl carrier wheel 52*a* meshed directly with the winding mobile mass 60 turns in the clockwise direction (wheel 51*a* engaged). It follows that the wheel 41 turns in the anticlockwise direction. Here the two second wheels 51*a*, 51*b* are respectively engaged and disengaged.

As mentioned above, the reverser advantageously includes two second freewheels 51*a*, 51*b*. The output of the reverser therefore turns in the same given direction whatever the direction of rotation of the input of the reverser.

Only manual winding enables disengagement of the first freewheel 40 via the driver 30 and the pinion 45.

During a manual winding phase the first freewheel is disengaged and the reverser 50 is advantageously disengaged from the driver 30 by the first freewheel 40. In fact, in this phase the pinion 45 and the ring 46 secured together are driven in the free relative direction (the anticlockwise rotation direction of the pinion 45 relative to the wheel 41 in FIG. 3). The rotation of the ring 46 fastened to the pinion 45 drives the balls 43 out of reach of the portions of the inclined planes of the housings of the separators 42 adapted to wedge them. The balls 43 are then released and the separators are loosened from the ring 46. During this phase the first freewheel 40 therefore behaves as a guide for rotation of the pinion 45 relative to the ring 46. In other words, when it is disengaged the intrinsic functioning of the first freewheel 40 enables free rotation of the pinion 45 substantially as if it were assembled onto a guide, such as a bearing, with a substantially negligible torque, friction and wear, with no scraping noise or oscillation of elements.

This advantageously results in a sensation and a winding torque on the winding stem 10 equivalent to a movement with no automatic winding system whilst preserving the second wheels 51*a*, 51*b* of the reverser 50.

As the first freewheel 40 is directly engaged with the reverser 50, the automatic winding torque generated by the winding mobile mass 60 that said first freewheel has to withstand is lower than if that first freewheel were arranged close to the ratchet 21. This arrangement therefore offers a more favourable transmission ratio and advantageously enables use of an optimised ball type first freewheel 40 with much better performance in terms in particular of dead angle and intrinsic friction than those known from the prior art used to disengage an automatic winding chain.

During manual winding it is preferable to guarantee that the first freewheel 40 is disengaged at all times and consequently for it to be impossible to load the reverser 50. To achieve this, the torque for disengaging the first freewheel 40 mounted on the reverser 50 must be lower than the disengagement torque of the latter. Now, the low transmission ratio between:

- the first freewheel 40, and
- the reverser 50
- achieved by the solutions described above and the use of a first freewheel 40 make it possible to guarantee a very low disengagement torque whatever the speed of rotation. A freewheel functioning by wedging, such as a ball type first freewheel 40, advantageously offers a very low disengagement torque.

The dead angle at the first freewheel 40 has no or little influence on manual winding performance. The dead angle of the first freewheel 40 is the maximum angle that the wheel 41 must travel relative to the ring 46 before the wheel 41 and the ring 46 are again secured to one another.

However, if the ratchet 21 is immobilised by a ratchet pawl after manual winding automatic winding is effective only once the dead angle of the first freewheel 40 has been caught up. Consequently, the first movements of the winding mobile mass 60 will serve only to make up said dead angle, leading to momentary ineffective automatic winding.

The type of first freewheel 40 adopted and the architecture proposed here enable this disadvantage to be limited. In fact, the intrinsic functioning of the first freewheel 40 advantageously enables a very small dead angle to be achieved. Furthermore, given that the first freewheel 40 is directly engaged with the reverser 50, it is advantageously located where the transmission ratio with the winding mobile mass 60 is the lowest.

Consequently, the dead angle of the first freewheel 40 is more rapidly caught up by the movements of the winding mobile mass 60 than if the first freewheel 40 had been placed closer to the ratchet 21.

Once the first freewheel 40 is engaged, the dead angle of the first freewheel 40 no longer has any influence on the performance of automatic winding, because it then remains constantly engaged until the next manual winding.

A first reduction ratio between:

- an output of the reverser 50, and
- an input of the first freewheel 40 is preferably less than 8, or even less than 6, or even less than 5.

The automatic winding chain 200 preferably includes a first reduction chain extending from the winding mobile mass 60 to the first freewheel 40, in particular the wheel 41, having a second reduction ratio less than 6, or even less than 5, or even less than 4.

The automatic winding chain 200 preferably includes a second reduction chain extending from the first freewheel 40, in particular of the pinion 45, to the ratchet 21 of the barrel 20 having a third reduction ratio greater than 20, or even greater than 25, or even greater than 30.

The ratio of the second reduction ratio to the first reduction ratio is preferably less than 3, or even less than 2, or even less than 1.

The solution described uses a pawl or obstacle type reverser directly engaged with a winding mobile mass and advantageously includes a unidirectional bearing of ball freewheel type enabling optimisation of performance and the sensations of the user during manual winding.

The proposed solution finally enables disengagement of an automatic winding chain with the aid of a freewheel advantageously functioning by wedging, such as a unidirectional ball bearing. The freewheel is advantageously directly engaged with the reverser equipped with freewheels functioning by obstacle, such as pawl type freewheels. This solution enables the benefit to be obtained of a low and constant manual winding torque. In fact, as disengagement is achieved with no oscillating components, the variation of torque and wear problems are solved. Furthermore, this unidirectional bearing enables the benefit to be obtained of a low dead angle that can be caught up by a much lower number (of the order of 5 to 8 times lower) of winding mobile mass turns than in the known solutions, thanks also to arranging it as close as possible to the reverser.

The connections, in particular the teeth, adapted to cooperate directly with upstream elements in the automatic winding chain 200 are or constitute inputs and the connections, in particular the teeth, adapted to cooperate directly with elements situated downstream in the automatic winding chain 200, are or constitute outputs.

In a series assembly the input of one element is connected to the output of a preceding element or upstream element and the output of the element is connected to the input of a following or downstream element.

The invention claimed is:

1. A transmission mechanism for an automatic winding mechanism for a timepiece including a series assembly of:

a first freewheel functioning by wedging, a reverser including at least one unidirectional coupling functioning by obstacle or at least one second freewheel functioning by obstacle, and a winding mobile mass, wherein a first reduction ratio between an output of the reverser and an input of the first freewheel is less than 8.

2. The transmission mechanism according to claim 1, wherein the reverser and the first freewheel are mechanically connected directly to one another.

3. The transmission mechanism according to claim 2, wherein the reverser and the first freewheel are mechanically connected directly to one another by direct meshing of an output of the reverser with an input of the first freewheel.

4. The transmission mechanism according to claim 1, wherein at least one second freewheel is a freewheel with at least one pawl.

5. The transmission mechanism according to claim 4, wherein the at least one pawl is made of ceramic.

6. The transmission mechanism according to claim 1, wherein the first freewheel includes at least one blocking element functioning by wedging.

7. The transmission mechanism according to claim 6, wherein the at least one blocking element functioning by wedging includes roller elements or sliding elements.

8. The transmission mechanism according to claim 7, wherein the at least one blocking element functioning by wedging includes roller elements which are balls or rollers or runners having a shape adapted for rolling.

9. The transmission mechanism according to claim 7, wherein the at least one blocking element functioning by wedging includes sliding elements which are runners having a shape adapted for sliding, or cams.

10. The transmission mechanism according to claim 1, wherein the reverser includes two second freewheels so that an output of the reverser turns in a same given direction whatever a direction of an input of the reverser.

11. An automatic winding chain or automatic winding module including the transmission mechanism according to claim 1.

12. The automatic winding chain or automatic winding module according to claim 11, including a first reduction chain extending from the winding mobile mass to the first freewheel having a second reduction ratio less than 6, and/or a second reduction chain extending from the first freewheel to a ratchet of the barrel having a third reduction ratio greater than 20.

13. The automatic winding chain or automatic winding module according to claim 11, wherein an input of the reverser and the winding mobile mass are mechanically connected directly to one another.

14. A timepiece movement including the automatic winding chain or automatic winding module according to claim 11.

15. The timepiece movement according to claim 14, further including a manual winding chain.

16. The timepiece movement according to claim 14, wherein the automatic winding chain or automatic winding module is adapted to be disengaged during manual winding by manipulating an actuator member which is a stem.

17. A timepiece including a transmission mechanism according to claim 1.

18. The transmission mechanism according to claim 1, wherein the first reduction ratio between:

the output of the reverser, and the input of the first freewheel is less than 6.

19. The transmission mechanism according to claim 18, wherein the first reduction ratio between:

the output of the reverser, and the input of the first freewheel is less than 5.

20. An automatic winding chain or automatic winding module for a timepiece including a transmission mechanism including a series assembly of:

a first freewheel functioning by wedging, a reverser including at least one unidirectional coupling functioning by obstacle or at least one second freewheel functioning by obstacle, and a winding mobile mass, wherein a first reduction chain extending from the winding mobile mass to the first freewheel has a second reduction ratio of less than 6.

21. The automatic winding chain or automatic winding module according to claim 20, wherein a second reduction chain extending from the first freewheel to a ratchet of the barrel has a third reduction ratio greater than 20.

22. An automatic winding chain or automatic winding module for a timepiece including a transmission mechanism including a series assembly of:

a first freewheel functioning by wedging, a reverser including at least one unidirectional coupling functioning by obstacle or at least one second freewheel functioning by obstacle, and a winding mobile mass, wherein a second reduction chain extending from the first freewheel to a ratchet of the barrel has a third reduction ratio greater than 20.

* * * * *